June 3, 1969  F. E. O'BRIEN ETAL  3,448,278
PHOTOELECTRIC DIAMETER MEASURER WHEREIN PULSE WIDTH IS A
MEASURE OF DIAMETER
Filed Aug. 30, 1966  Sheet 4 of 5

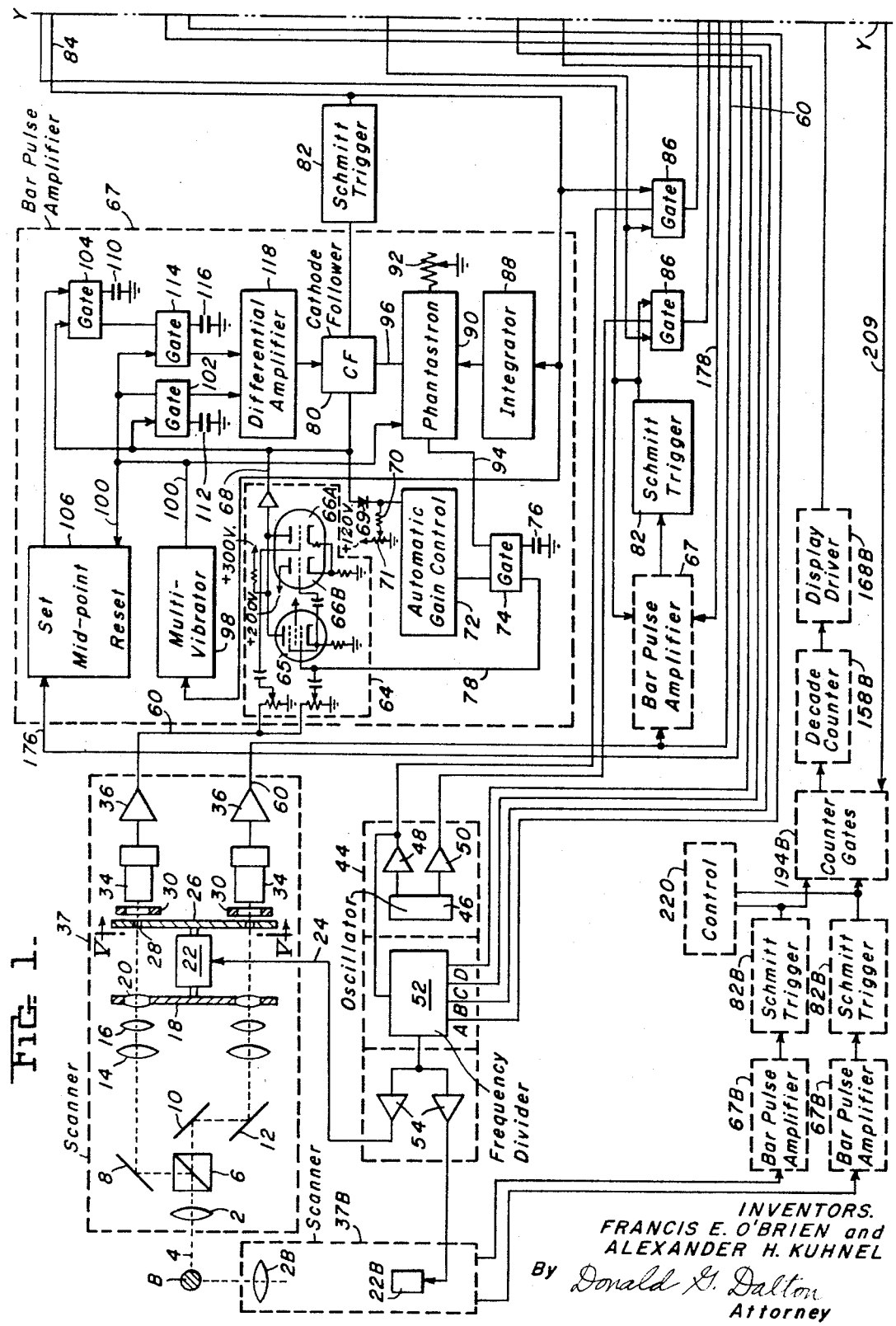

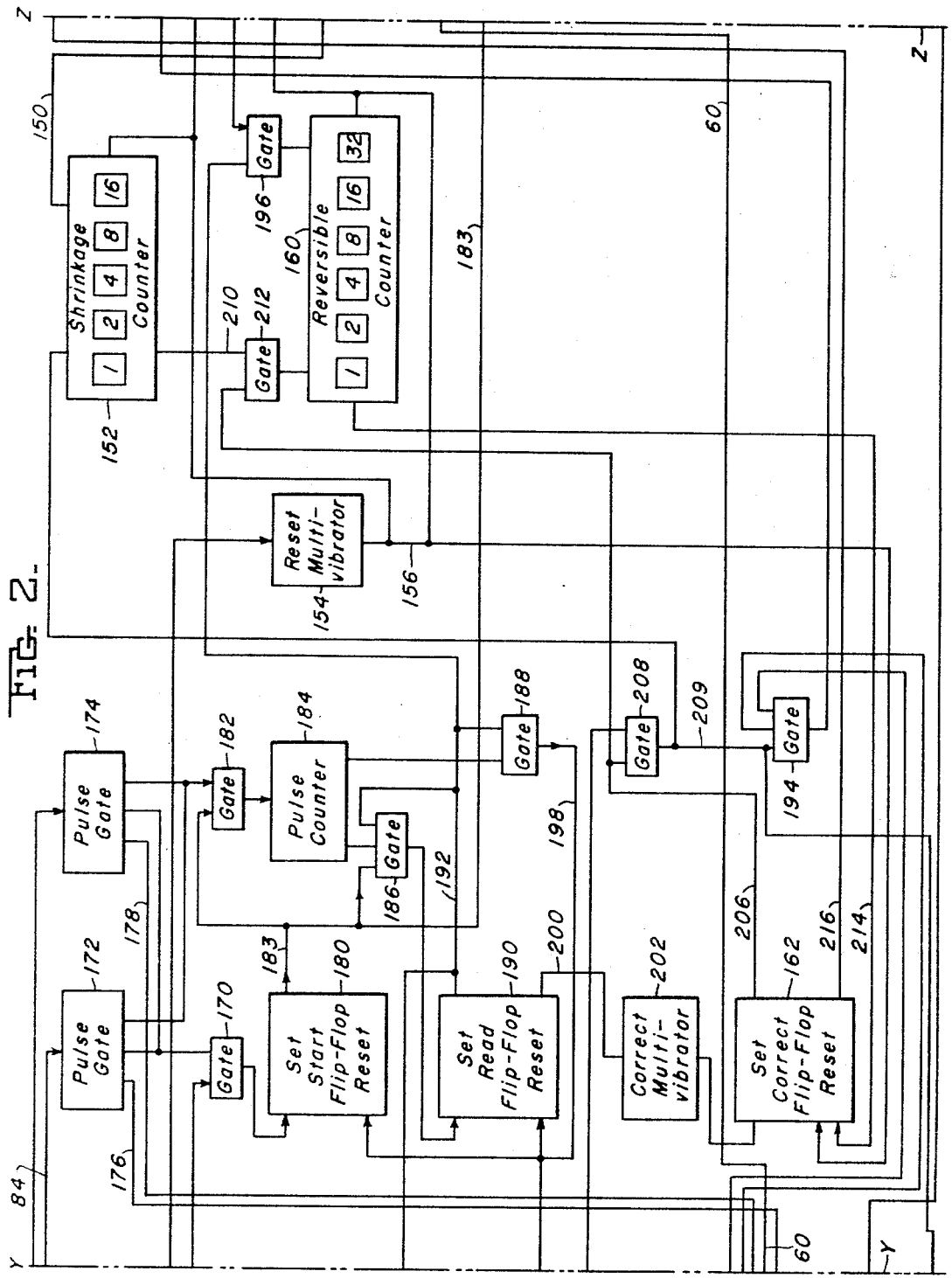

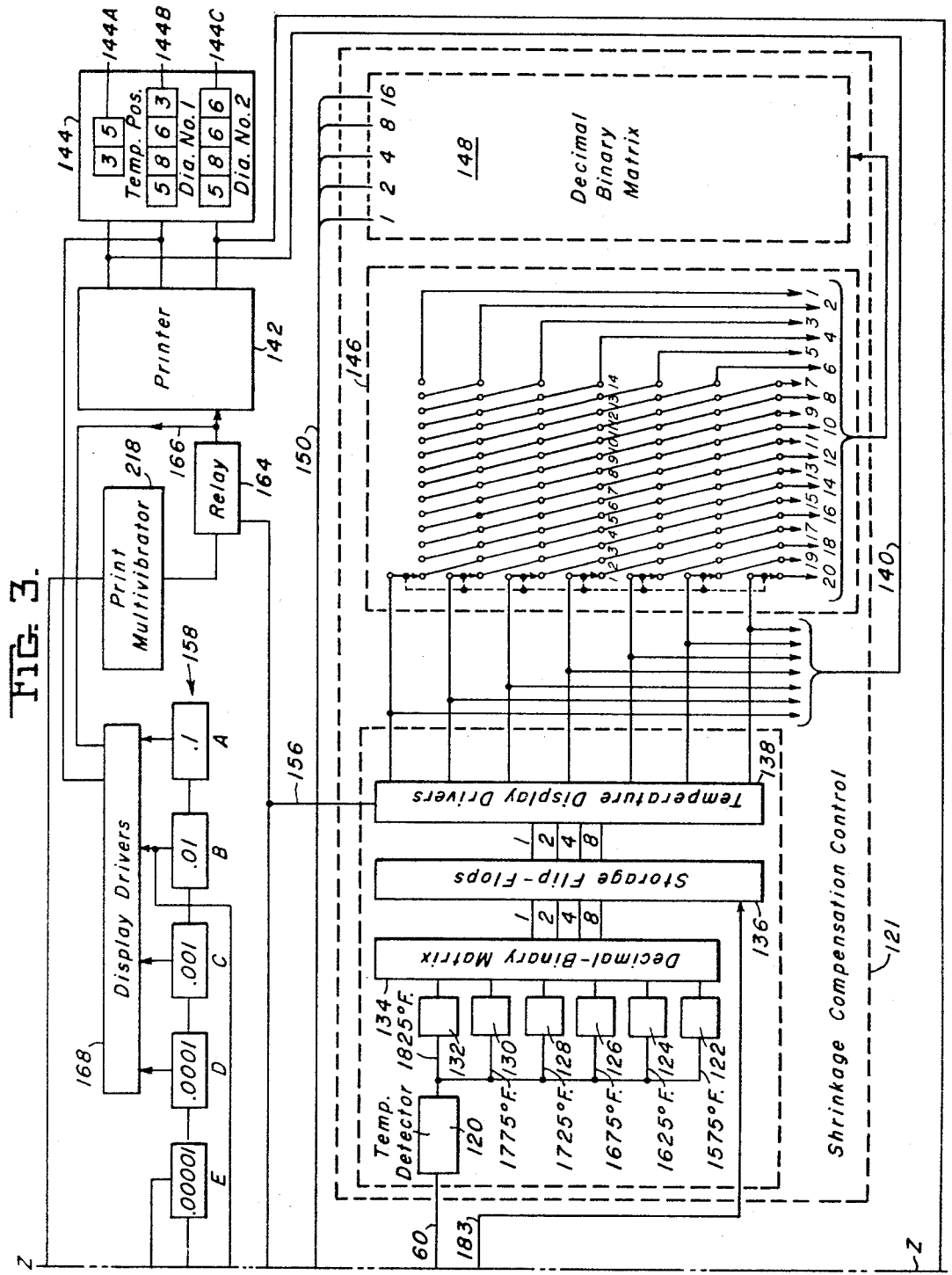

INVENTORS.
FRANCIS E. O'BRIEN and
ALEXANDER H. KUHNEL
By Donald G. Dalton
Attorney

[United States Patent Office — 3,448,278 — Patented June 3, 1969]

3,448,278
PHOTOELECTRIC DIAMETER MEASURER WHEREIN PULSE WIDTH IS A MEASURE OF DIAMETER
Francis E. O'Brien, Churchill Borough, Pa., and Alexander H. Kuhnel, Berkeley Heights, N.J., assignors to United States Steel Corporation, a corporation of Delaware
Filed Aug. 30, 1966, Ser. No. 576,121
Int. Cl. G01n 21/30
U.S. Cl. 250—219        13 Claims

ABSTRACT OF THE DISCLOSURE

A non-contact precision gage for measuring the diameter of a moving hot bar has an optical system which simultaneously scans the bar in opposite directions and focuses radiant energy from the bar as shaped pulses on two photomultiplier tubes. The output pulses of the tubes are amplified, shaped, and the pulse width, a measure of the hot bar diameter, is determined by a digital counter. Provision is made for averaging the totals from a series of pulses and correcting the measurement to ambient temperature.

---

The present invention relates to a gage for measuring the diameter of a hot bar and more particularly to a non-contact precision gage to measure the diameter of a hot steel round bar while it is being rolled in a bar mill. It will be understood that the term diameter is used in the sense of a transverse dimension of the bar and is not limited to measuring the true diameter of a perfectly round bar.

Tolerance requirements for hot steel bars have brought about the need for indicating and recording on a continuous basis the measurement of two diameters of the hot round as it is delivered from the last finishing stand. The present common practice is to periodically burn a sample from the end of the round, air cool the sample, and then measure the inside and outside shoulder diameters. In addition, samples are taken representative of the middle and front end of the bar. These samples indicate whether the product is satisfactory from a dimensional standpoint and what mill adjustments are required. Because of the time required to measure and evaluate the sample, many bars are rolled after the taking of the sample and before it is determined whether or not mill adjustments must be made.

The rolling operation involves many adjustments. Guides, roll stands, twisters between stands, and the effects of bearing and roll wear are all subject to change, both gradual and sudden, and the corresponding influence these have on bar dimensions indicates the need for continuous and close scrutiny of dimensions if a large percentage of product is to be produced within close tolerance limits. Obviously, this cannot be done by destructive gaging or by waiting until the round has cooled. Gages have been provided for obtaining the diameter of a bar while still hot and in the mill, but those of which we have knowledge have various disadvantages. They may not compensate properly for the difference in diameter of the bar in its hot and cold condition or its accuracy may be poor for failure to compensate for transverse movement of the bar while being gaged.

It is therefore an object of our invention to provide a non-destructive precision rounds gage designed to measure, indicate and record the diameters of hot rounds as they are being rolled.

Another object is to provide such a gage that will correct the measured diameters to room temperature diameters.

Still another object is to provide such a gage to determine eccentricity or tendencies toward oval or elliptical shape.

These and other objects will be more apparent after referring to the following specification and attached drawings, in which:

FIGURES 1, 2 and 3, when connected end to end on lines Y—Y and Z—Z, are a schematic diagram of the gage of our invention;

Figure 4:
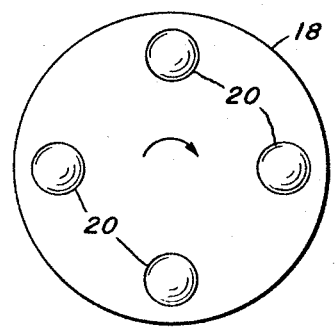
FIGURE 4 is an end view, on an enlarged scale, of the scanning disc of FIGURE 1.
Figure 5:
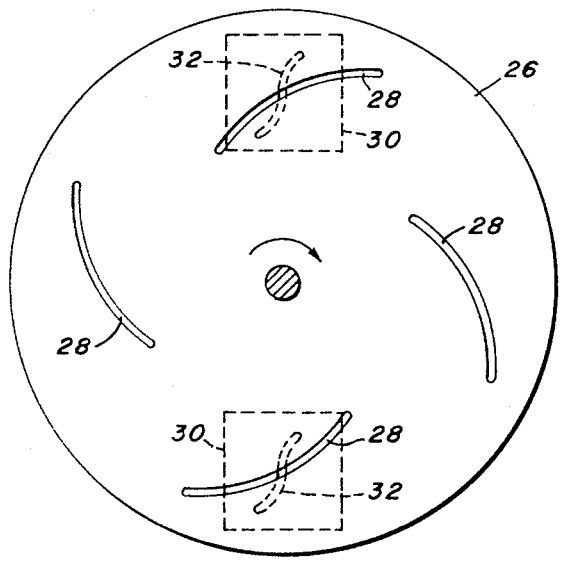
FIGURE 5 is a view, on an enlarged scale, taken on the line V—V of FIGURE 1.

Referring more particularly to FIGURE 1, an objective lens 2 is mounted so that its axis 4 intersects the axis of a moving hot round bar B which is to be measured. Light rays pass from the hot round bar B through the lens 2 and are split by a prismatic beam splitter 6. The beam splitter 6, and the mirrors 8, 10 and 12 bend the light path into two separate parallel paths. The light in each path passes through a field lens 14 and a second objective lens 16 to a scanning disc 18. Scanning disc 18, as shown in FIGURE 4, has four scanning lenses 20 mounted 90° apart. The scanning disc 18 is rotated by an 1800 r.p.m. synchronous motor 22 supplied with power through lead 24. The motor 22 also rotates a disc 26 having four specially designed slits 28 spaced 90° apart, as shown in FIGURE 5, and aligned with scanning lenses 20. Immediately behind the rotating disc 26 are a pair of plates 30 each with a specially designed generally vertical slit 32, as shown in FIGURE 5. Light from the scanning lens 20 passing through the slits 28 and 32 impinges on the cathodes of transducers or photomultiplier tubes 34. The output of each photomultiplier tube 34 is amplified in an amplifier 36, which is a conventional D.C. coupled linear amplifier with low impedance output. The photomultiplier tubes 34 generate an electrical pulse, the width of which is proportional to the diameter of the bar and the height of which is proportional to the temperature of the bar. The parts so far described constitute a first scanner 37. The optical system for feeding radiant energy signals to the photomultiplier tube 34 may be much simpler than that shown, especially under ideal conditions, but the system shown compensates for the magnification errors resulting from the bar B moving toward and away from the lens 2 so that a one to one image of the bar B is in the image plane parallel to the plane of the scanning lenses 20. This is accomplished by field lens 14 which is located a short distance to the right of the image formed by lens 2 so as to form a magnified virtual image of the first image. This magnification is greater for first images that are too small and less for those that are too large. Hence, when these virtual images are transferred to the scanning plane by lens 16, they are proportional so that their projections in the scanning plane are very close to the correct size regardless of normal relatively small transverse movement of the bar B. As the scanning disc 18 is rotated, an image of the aperture formed by the intersection of slits 28 and 32 is formed in the image plane and moves across the image of the hot bar formed in the same image plane so that for each revolution of motor 22, the hot round is scanned four times. The width of the pulse generated by photomultiplier tube 34 is actually proportional to the time required for the image of the aperture to traverse the distance from one edge of the bar B to the other edge. This time is directly proportional to the diameter only if aperture image traverses the bar B at constant velocity along a line normal to the edges of the bar B.

When the hot bar B appears in front of the scanner, the objective lens 2 produces an image of the bar at each field lens 14. This is accomplished by the beam splitter 6 and off-set first surface mirrors 8, 10 and 12. The scanning lens 20 forms an image at the field lens 14 of the area of intersection of the fixed slit 32 and rotating slit 28. Thus, the only radiant energy to reach the photo transducer 34 has to enter through this area of intersection. The fixed slit 32 is shaped to that as the rotating slit 28, which is a segment of a circle having its axis offset from the axis of the disc 26, causes the image of intersection to traverse the field lens 14 such that for equal increments of rotation of the scanner lens 20 the image of the area of intersection moves a corresponding increment normal to the edge of the bar. It is by the shape of the slits that the scan in the measuring direction is linearized.

Up and down motion of bar B will cause a plus error when the motion is in the same direction as the scan and a minus error when in the opposite direction. Compensation for this error is obtained by having two scanning lenses 180° apart so that one scans up while the other scans down. Averaging of these readings, by the means disclosed hereinafter eliminates this error. The hot diameter of the rod will vary substantially from the cold diameter since steel bar mills finish in the temperature range of 1500° to 1900° F. and a shrinkage correction must be made to determine the diameter of the bar at room temperature. The amount of shrinkage is dependent upon the composition and temperature of the round. This shrinkage is a maximum of 2% and the slits 28 and 32 are designed so that the measurement provided by the scanner is equal to 98% of the hot measured diameter of the bar B. Thus a coarse correction of .02 in. per inch of bar diameter is provided. Fine correction is made electronically as described later.

Since the transverse dimensions of the bar at right angles to one another may vary it is desirable to provide a second indentical scanner 37B including lens 2B arranged with its axis intersecting the axis of bar B at right angles to the axis of lens 2. Side guides (not shown) are provided to limit transverse movement of the hot bar to a minimum at the location of the gage.

Figure 6:
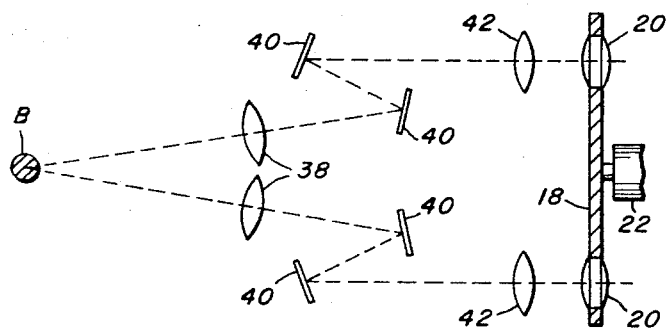
FIGURE 6 is a schematic view of another embodiment of the optical system of our invention.

In the embodiment of the optical system shown in FIGURE 6, two objectives lenses 38 are mounted so that their axes converge to coincide at the axis of the moving hot bar B. Mirrors 40 bend the light into two parallel paths each having a field lens 42 in front of the scanning lenses 20. The remaining part of the optical system is the same as in FIGURE 1.

A time base 44, FIGURE 1, for the electronic part of the gage includes a transistorized, crystal controlled oscillator 46 which generates a frequency of 2,949,120 c.p.s. with two outputs 180° out of phase. The outputs are shaped and amplified by two pulse shaping amplifiers 48 and 50 to provide two trains of pulses, each 2,949,120 c.p.s. displaced by 180°. The output of amplifier 48 goes to a frequency divider 52, which through a series of flip-flops, not shown, provides a series of timing pulses 52A, 52B, 52C and 52D. The frequency divider also provides, through power amplifier 54, a 115 volt 60 cycle power source for motors 22 and 22B.

BAR PULSE AMPLIFIER

The output 60 of each amplifier 36 is connected to a linear amplifier 64 which includes a 6BA6 tube 65 and dual triode 66A, 66B. The amplifier 64 is part of a bar pulse amplifier 67. Output 68 of amplifier 64 is connected to ground through diode 69, resistor 70, and potentiometer 71 which back biases the diode 69. Excess of the signal above the back bias passes to an automatic gain control 72.

The distortion of tube 65 is proportional to the signal amplitude, being greatest for the largest signal. By combining the outputs of tube 65 and linear triode 66A so that about 80% of the largest signal results from the triode 66A and only 20% (necessary for control) from the tube 65, linearity is much improved. As the input signal amplitude decreases the triode portion decreases and the tube 65 portion increases until, for small signals, practically all of the signal comes from the tube 65 which for small signals has very little distortion. Further improvement in linearization is accomplished by the other half of the dual triode 66B whose grid is connected to the cathode of tube 65. The distorted signal appears in the common cathode resistor for both sections of the dual triode. Since the grid of tube 66A sees the input signal 60 and a portion of the cathode is driven by the distorted signal, the resulting anode current of triode 66A now is distorted and is inverted relative to the distortion in the anode current of tube 65. The common anode resistor combines all the above signals and nearly all distortion is cancelled out.

The output of automatic gain control 72 passes through a gate 74 and charges a condenser 76. The condenser voltage through conductor 78 controls the grid bias of amplifier 64 so as to maintain the output of amplifier 64 close to the back bias value.

The output 68 of the linear amplifier 64 also goes through a cathode follower 80 to a Schmitt trigger 82. The output 84 of the Schmitt trigger enables a counter gate 86 which will be described later. The output 84 of the Schmitt trigger 82 also supplies an integrater circuit 88 which supplies a phantastron 90. The output of the phantastron 90 is set by a variable resistor 92. One output 94 of the phantastron 90 enables gate 74 and another output 96 provides a clamp pulse to cathode follower 80. Output 84 of Schmitt trigger also sets a multi-vibrator 98. Output 100 of multi-vibrator 98 provides the set pulse for the phantastron 90.

The output 68 of amplifier 64 is also transmitted to a top half gate 102 and a bottom half gate 104. The bottom half gate 104 is enabled by the set output of a mid point flip flop 106. the set pulse of which will be described later. Consequently, the bar pulse output charges condenser 110. The output 100 of multi-vibrator 98, set by Schmitt trigger 82, also resets flip flop 106, leaving a charge on condenser 110 representing the bottom half of the bar pulse. The output 100 also enables the gate 102, and the remainder of the pulse passes through gate 102 charging a condenser 112 and leaving a charge on condenser 112 representing the top half of the bar pulse. The output 100 also enables a gate 114 and the charge from condenser 110 is transferred to another condenser 116. The voltages of condensers 112 and 116 are then compared in a differential amplifier 118 and the difference, a D.C. voltage, is passed to cathode follower 80.

Figure 7:
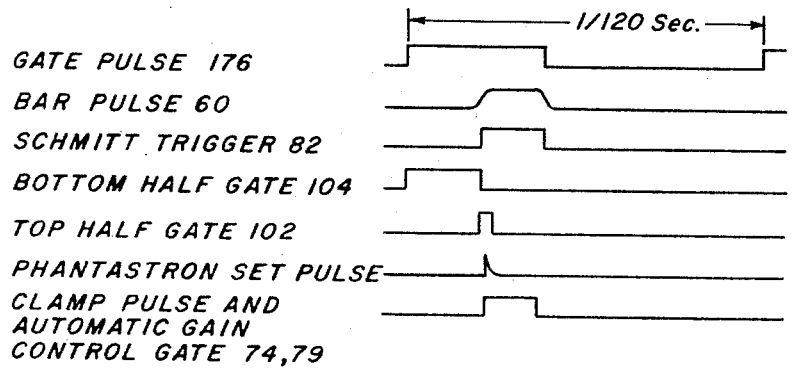
FIGURE 7 is a timing diagram for elements of the bar pulse amplifier.

The hot diameter of the bar is represented by the lapsed time between the mid points of the leading and trailing edges of the bar pulse 60 (FIGURE 7). A mid point detector circuit in each of the bar pulse amplifiers accurately senses the mid point of the leading edge of the respective bar pulse 60 and provides control of the triggering point of the Schmitt trigger 82. It will be understood that the leading pulse edge of one channel represents the signal level at the top edge of the bar B and the leading pulse edge of the other channel the signal level at the bottom edge of bar B. The output of the amplifier 118 for a small difference in top and bottom halves of the bar pulse adds a variable D.C. voltage to the base of the bar pulse by use of cathode follower 80. Thus, the bar pulse sets on a variable D.C. base which is continuously adjusted to keep the Schmitt trigger 82 opening at near the mid point of the leading edge of the amplifier bar pulse 68.

The function of the bar pulse amplifier 67 is to derive from the bar pulse input 60 a gating voltage that will, through the Schmitt trigger 84, enable the counter gate 86 during the period equivalent to the interval between the mid points of the leading and trailing edges of a symmetrical bar pulse. On an unsymmetrical pulse, partial correction is accomplished. The shape of the bar pulse and Schmitt trigger is illustrated in FIGURE 7, a timing diagram for the elements of the bar pulse amplifier.

The function of the linear amplifier 64 is to provide a sufficient signal for the Schmitt trigger 82. It is a linear variable gain amplifier with a gated automatic control system 72 and 74, used to provide a constant amplitude output pulse for a variable amplitude input.

It is possible that scale or cold spots on the hot round may distort the bar pulse and cause the amplitude to drop below the triggering level of the Schmitt trigger 82. To prevent an erroneous reading, the clamp pulse 96 insures that once the Schmitt trigger has fired it will remain open for approximately 90% of the duration of the bar pulse even though the bar pulse may be distorted. The output of the integrator 88 is a D.C. voltage proportional to the width of the Schmitt trigger output which, in turn, is proportional to the width of the bar pulse. The phantastron 90, when set by the output 100 of the multi-vibrator 98, generates a clamp pulse having a width that is determined by the D.C. voltage at its plate and is therefore proportional to the width of the bar pulse. By adjusting resistor 92 the width of the output pulse is set at approximately 90% of the bar pulse width. The automatic gain control gate pulse for gate 74 is derived in the same manner as the clamp pulse. Reference to FIGURE 7, which illustrates the time relationship of the control signals will show the automatic gain control gate pulses and the clamp pulses starting after the bar pulse has reached its full amplitude and ends before the amplitude starts to decrease.

To summarize, the bar pulse amplifier (1) amplifies the bar pulse in amplifier 64, (2) regulates the amplification so as to provide a constant amplitude pulse which is a linear reproduction of the input pulse independent of bar temperature over the operating range, (3) inserts a variable D.C. base to the bar pulse so that Schmitt triggers always open at the mid-point of the leading edge of the pulse, and (4) provides a clamp pulse which keeps the Schmitt trigger in the on condition for approximately 90% of the duration of the bar pulse so as to prevent inadvertent operation of the Schmitt trigger due to noise on the pulse.

SHRINKAGE COMPENSATION CONTROL

The output 60 of either of the amplifiers 36 is transmitted to a bar temperature detector 120 of a shrinkage compensation control 121. The bar temperature detector 120 utilizes the amplitude of the bar pulse output to determine the temperature of the bar. The amplitude of the bar pulse varies with the amount of radiant energy emitted by the bar which, in turn, is a measure of the temperature of the bar. The output of the bar temperature detector 120 is a D.C. voltage proportional to the amplitude of the bar pulse. This output is transmitted in parallel to six Schmitt triggers 122, 124, 126, 128, 130 and 132 which are calibrated to trip at voltages representing the indicated temperatures. For example, Schmitt trigger 124 trips at 1625° F. and Schmitt trigger 128 trips at 1725° F. The Schmitt trigger outputs are decoded in a decimal binary matrix 134 having a binary output representing one of seven temperature ranges established by the six triggering temperatures and which is transmitted to storage flip-flops 136. Output of the storage flip-flops 136 is transmitted to the temperature display drivers 138.

Temperature display drivers 138 convert the binary coded temperature ranges into decimal form and transmits them through conductor 140 to a remote printer 142 and indicator 144, thus providing a visual indication of the bar temperature within one of the seven temperature ranges. The output of the display driver 138 is also transmitted to a shrinkage selector switch 146.

The shrinkage selector switch 146 is a seven pole, fourteen position rotary selector switch. The seven wipers of the switch are connected to the seven outputs of the temperature display drivers 138 and the twenty numbered contacts of the switch are connected to a decimal-binary matrix 148. The decimal-binary matrix 148 converts the decimal output of shrinkage selector switch 146 to binary form and transmits through 150 a complement (32 minus the switch output) as the shrinkage compensation increment to a shrinkage compensation control counter 152 in the programmer.

The switch position (1 to 14) is selected in accordance with the steel composition, a table is provided for the proper switch settings for various steel alloys as determined by the coefficient of expansion of the specific aloy. The fourteen numbers, 1 to 14, represent the amount of shrinkage that will occur in a bar in the middle temperature range, approximately 1700° F. The twenty outputs of the switch 146 represent the bar shrinkage correction for each .020 inch of bar diameter. Thus for any one position of switch 146, one of seven shrinkage corrections will be applied to the bar diameter measure depending on the temperature of the bar and the number of .020 inch increments contained in the bar measurement. For example, with the selector switch in position 2 (FIGURE 3) and with the middle temperature range the increment is 16 (complement is 16), with the selector switch in position 2 and with the highest temperature range the increment is 13 (complement is 19) and at the lowest temperature range the increment is 19 (complement is 13).

PROGRAMMER

Output pulse 52B is connected to a reset monostable multi-vibrator 154 to generate a reset pulse 156 to reset display drivers 138 in shrinkage compensation control 121. Pulse 156 also resets shrinkage counter 152, decade counter 158, reversible counter 160, "correct" flip-flop 162, and relay 164 which disconnects power 166 to display drivers 168 and printer 142. At approximately the same time, a second pulse 52A opens an enabling gate 170 for a period of 33 milliseconds.

Output pulses of Schmitt triggers 82 are connected to pulse gate multi-vibrators 172 and 174. Reset outputs 176 and 178 are connected one to the mid-point flip-flop 106 of each bar pulse amplifier 67. Gate 170 is connected to the output of pulse gates 172 and 174. The output of gate 170 is connected to start flip-flop 180. A gate 182 is connected to the outputs of gates 172 and 174 and output 183 of flip-flop 180. The output of gate 182 is connected to a pulse counter 184. The output 183 of flip-flop 180 is also connected to storage flip-flops 136 of control 121 and to gate 186. The output of pulse counter 184 is conected to gates 186 and 188. The output of gate 186, at the end of the tenth gate pulse, sets a read flip-flop 190. The period of time represented by the first ten gate pulses is utilized to stabilize the mid-point detector system, the automatic gain control, and the temperature detector system. Output 192 of flip-flop 190 enables gates 86 and permits bar measurement pulses from amplifiers 48 and 50 to pass through a gate 194 to decade counters 158. The set output 192 also enables gate 188 and also enables a count up gate 196 of reversible counter 160. Decade counter 158 has five stages A, B, C, D and E. The second stage B or 0.01 decade counter transmits pulses to reversible counter 160 through gate 196. At the end of the twentieth gate pulse, the output 198 of pulse counter 184 passes through gate 188 to reset flip-flops 180 and 190.

If a measurement is started so close to the end of the bar B that ten gate pulses are not counted in the pulse counter 184, the pulse counter output 198 will not occur and, therefore, flip flops 180 and 190 would not be reset, and a partial reading would be started in the decade counters 158. In order to avoid this, a pulse 52C from the frequency divider 52 resets flip flops 180 and 190 approximately 180 milliseconds after the start of the read cycle.

Reset output 200 of read flip flop 190 turns on a multivibrator 202 and, after a delay of approximately 10 milliseconds to insure that both scanners have completed their measurement, the output of multi-vibrator 202 sets correct flip flop 162.

Set output 206 of correct flip flop 162 enables a gate 208 so that shrinkage correction pulses 52D from the frequency divider 52 may be transmitted simultaneously to the decade counter 158 through conductor 209 and gate 194 and to the shrinkage counter 152. While shrinkage correction pulses are going to the decade counter 158, the pulses are also added in the shrinkage counter 152 in terms of increments, as determined by the shrinkage compensation control 121. Each time counter 152 fills up for each increment of .02 inch, a count is transmitted through 210 and "count down" gate 212, which has been enabled by the set output 206 of correct flip flop 162, to the reversible counter 160 which counts down. When the reversible counter 160 reaches zero, the output 214 of the reversible counter 160 resets correct flip flop 162, thus disabling gates 208 and 212.

As a result, the number of pulses added to the basic diameter measurement is equal to the correction increment preset by the shrinkage compensation control 121, multiplied by the number of 0.020 inch increments measured by the reversible counter 160.

At the completion of the shrinkage compensation correction, reset output 216 of correct flip flop 162 turns on a print monostable multi-vibrator 218. The output of print multi-vibrator 218 sets relay 164 which transmits a print command pulse 166 to the printer 142 and enables the display drivers 168 to set the remote indicator 144.

The temperature ranges are also transmitted from the shrinkage compensation control 121 to the printer 142 and remote indicator 144. The indicator 144 displays one of the seven temperature ranges at 144A, and also uses another digit at 144A to represent the relative position of the two scanners to each other.

Under the control of the one pulse per second pulse 52A from the frequency divider 52, a new measurement is taken and recorded once per second as long as a hot round is present in the field of the scanners.

Since the pulses from the multi-vibrators 172 and 174, which initiate the reading cycle, are effectively generated by the bar pulse, no readings will be recorded if a bar is not present.

Figure 8:
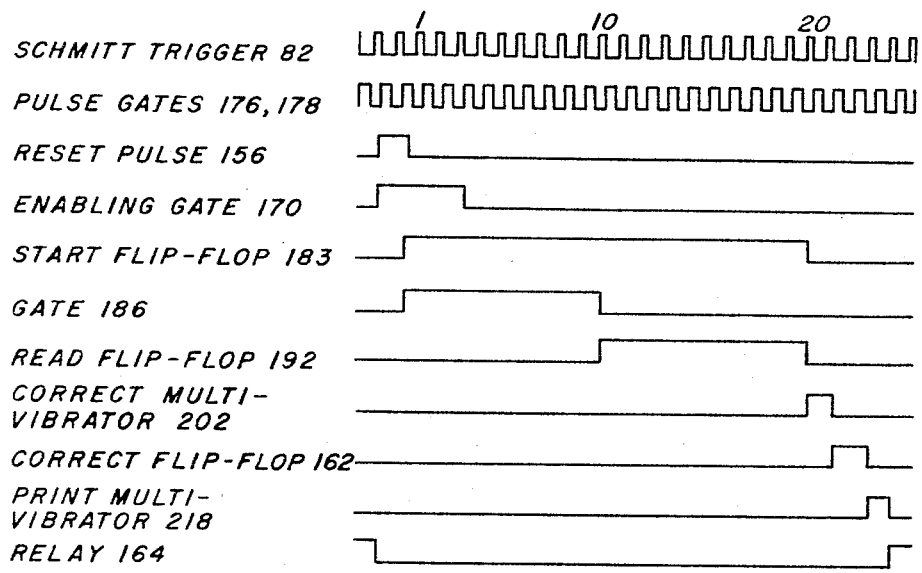
FIGURE 8 is a timing diagram for elements of the programmer.

The sequence of the program for controlling the measuring and temperature correction pulses is shown in the timing diagram of FIGURE 8.

When a second scanner 37B is used to determine the diameter of the bar B at right angles to the first scanner, the optical system and electronic equipment are duplicated except for the shrinkage compensation control. Hence, power is supplied from amplifier 54 to motor 22B and bar pulses are supplied to bar pulse amplifiers 67B which in turn are connected to Schmitt triggers 82B. A control 220 controls the operation of counter gate 194B, decade counter 158B, and display drivers 168B in the same manner as counter gate 194B, decade counter 158 and display drivers 168 are controlled. Shrinkage counts 209 are provided to gate 194B from the shrinkage compensation control 121 which functions simultaneously for both scanners. The display drivers 168B are connected to printer 142 and to scale 144C of indicator 144.

SUMMARY OF OPERATION

Position (1 to 14) of switch 146 in shrinkage compensation control 121 is selected in accordance with the steel composition of the bar B being gaged and the electrical system is energized in order to ready the gage for use. Since the pulses from multivibrators 172 and 174, which initiate the reading cycle, are not generated until a hot bar is present there will be no reading on the indicator 144. There will be zero readings on shrinkage counter 152, reversible counter 160, and decade counter 158.

When a hot bar appears in front of scanner 37, bar pulses are generated substantially simultaneously by each of the photomultiplier tubes 34. The width of each pulse will be proportional to 98% of the hot diameter of the bar B and the amplitude of the pulse proportional to the temperature of the bar.

The output 60 of one of the amplifiers 36 is transferred to the bar temperature detector 120 which generates a D.C. voltage proportional to the amplitude of the amplitude of the bar pulse. This voltage output trips one or more of the Schmitt triggers 122 to 132 according to the temperature of the bar, and the output of the Schmitt triggers is decoded in decimal binary matrix 134 and transmitted to temperature display drivers 138. Here the signal is converted into decimal form and then transmitted to shrinkage selector switch 146 and to decimal binary matrix 148. The output of matrix 148 is a measure of the number of pulses from 52D which must be added to the bar measurement for each .02 inch increment of bar diameter to correct for shrinkage. Assuming that this number is nine and with a 32-count counter 152, the complement of this number or "23" will be transferred to and stored and displayed on counter 152 until the measurement is completed except for temperature correction.

The pulses from each of the photomultiplier tubes 34 go to the corresponding bar pulse amplifier 66 where the pulse is amplified to provide a constant amplitude pulse independent of bar temperature and to insure that the Schmitt triggers 82 always open at the mid point of the leading edge of the pulse.

Periodically, for example once every second, an output pulse 52B from the time base 44 resets temperature display driver 138, resets shrinkage counter 152 to indicate the necessary number of counts, resets the decade counters 158 to zero, resets the reversible counter 160 to zero, and disconnects power to display drivers 168 and printer 142. Approximately at the same time, pulse 52A opens gate 170 for 33 milliseconds. With the circuit in this condition, the first detected bar pulse triggers one of the Schmitt triggers 82 and the trailing edge of its pulse sets the corresponding multi-vibrator 172 or 174 and the trailing edge of the next pulse from the other Schmitt trigger 82 sets the other one of the multi-vibrators 172 or 174. Thus, bar measurement pulses from the amplifiers 48 and 50 pass through gates 86 and 194 to decade counter 158. This continues until ten bar pulses from each bar pulse amplifier have been measured. The width of the bar pulses determines how long the gates 86 will remain open and hence the number of pulses representing 0.0002 inch passing to the decade counter 158. Also, the second stage B of decade counter 158 transmits pulses to reversible counter 160 through gate 196. The count is averaged in the decade counter 158 and the number of .02 in. increment of bar diameter will be displayed on reversible counter 160. At this time shrinkage correction pulses from 52D are added to shrinkage counter 152. The ninth such pulse will pass to reversible counter 160 and reduce its reading by one and the counter 152 will be reset to "23." This continues until the reversible counter 160 reaches zero. Simultaneously the pulses from 52D are being fed into decade counter 158 through gate 194. The bar diameter at ambient temperature then appears on indicator 144 at 144B. At the end of twenty bar pulses, the output 198 of pulse counter 184 is enabled by gate 188 to reset flip flops 180 and 190. After a delay of approximately 10 milliseconds the output of multi-vibrator 202 sets correct flip flop 204.

The reading remains on indicator 144 until another pulse 52A passes to gate 170 when the cycle is repeated.

In the same manner a reading is indicated on indicator 144 at 144C when scanner 37B is in use.

While two embodiments of our invention have been shown and described, it will be apparent that other adaptations and modifications may be made without departing from the scope of the following claims.

We claim:

1. Apparatus for measuring the diameter of a hot bar comprising a transducer for converting radiant energy to an electrical pulse having width and amplitude, an optical system directed at a diameter of said bar for periodically feeding radiant energy signals to said transducer proportional to said diameter to provide bar pulses having a width proportional to said diameter and means connected to the output of said transducer for measuring the width of said bar pulses.

2. Apparatus for measuring the diameter of a hot bar according to claim 1 including a second transducer and in which said optical system includes a rotatable scanning disc, at least two lenses mounted on said disc 180° apart with their axes parallel to the axis of said disc and the same radial distance therefrom, means providing a pair of images 180° apart on the bar side of said lenses, a rotatable slotted disc in axial alignment with said scanning disc on the transducer side thereof, said slotted disc having slots therein one in alignment with each of said lenses, members on the transducer side of said slotted disc having slots therein one in alignment with each of said transducers, said transducers being spaced from the axis of said disc the same radial distance as said lenses, and means for rotating said discs in synchronism.

3. Apparatus for measuring the diameter of a hot bar according to claim 1 including a second transducer and in which said optical system includes a rotatable scanning disc, four lenses mounted on said disc 90° apart with their axes parallel to the axis of said disc and the same radial distance therefrom, means providing a pair of images 180° apart on the bar side of said lenses, a rotatable slotted disc in axial alignment with said scanning disc on the transducer side thereof, said slotted disc having slots therein one in alignment with each of said lenses, members on the transducer side of said slotted disc having slots therein one in alignment with each of said transducers, said transducers being spaced from the axis of said disc the same radial distance as said lenses, the slots in said disc and members being shaped and arranged so that they pass 98% of said images and so that for equal increments of rotation of each lens the image of the area of intersection moves a corresponding increment normal to the edge of the bar, and means for rotating said discs in synchronism.

4. Apparatus for measuring the diameter of a hot bar according to claim 1 in which the means for measuring the width of said bar pulses includes a bar pulse amplifier connected to the output of said transducer for amplifying and shaping said bar pulses, and means connected to said bar pulse amplifier for measuring the average width of a plurality of bar pulses to determine the diameter of said bar.

5. Apparatus for measuring the diameter of a hot bar according to claim 4 including means responsive to the amplitude of said pulses for determining the temperature of said bar, and means responsive to said last named means for modifying the means connected to said bar pulse amplifier to compensate for shrinkage so as to determine the diameter of said bar at ambient temperature.

6. Apparatus for measuring the diameter of a hot bar according to claim 2 in which the means for measuring each bar pulse amplifier to determine the diameter of the width of said bar pulses includes a bar pulse amplifier connected to the output of each of said transducers for amplifying and shaping said bar pulses, and means connected to said bar pulse amplifiers for measuring the average width of an equal number of bar pulses from said bar.

7. Apparatus for measuring the diameter of a hot bar according to claim 6 including means for determining the temperature of said bar, and means responsive to said last named means for modifying the means connected to said bar pulse amplifier to compensate for shrinkage so as to determine the diameter of said bar at ambient temperature.

8. Apparatus for measuring the diameter of a hot bar according to claim 7 in which said optical system includes four lenses mounted on said scanning disc 90° apart with their axes parallel to the axis of said disc and the same radial distance therefrom, the slots in said disc and members being shaped and arranged so that they pass 98% of said images and so that for equal increments of rotation each lens the image of the area of intersection moves a corresponding increment normal to the edge of the bar.

9. Apparatus for measuring the diameter of a hot bar according to claim 8 including means in said amplifiers for preventing operation of said measuring means when the amplitude of the bar pulse is below a predetermined level.

10. Apparatus for measuring the diameter of a hot bar according to claim 9 including means for indicating said bar diameter measurement, and means for periodically erasing said diameter measurement indication and initiating another diameter measurement and indication.

11. Apparatus for measuring the diameter of a hot bar according to claim 1 in which the means for measuring the width of said bar pulses includes a bar pulse amplifier connected to the output of said transducer for amplifying, shaping, and detecting the midpoint of the amplitude of the leading edge of said bar pulses, and means connected to said bar pulse amplifier for measuring the average width of a plurality of bar pulses to determine the diameter of said bar.

12. Apparatus for measuring the diameter of a hot bar according to claim 4 including means for determining the temperature of said bar, and means responsive to said last named means for modifying the means connected to said bar pulse amplifier to compensate for shrinkage so as to determine the diameter of said bar at ambient temperature.

13. In apparatus for measuring the diameter of a bar including a pair of transducers for converting energy from said bar to electrical pulses; the improvement comprising an optical system including a rotatable scanning disc, at least two lenses mounted on said disc 180° apart with their axes parallel to the axis of said disc and the same radial distance therefrom, means providing a pair of images 180° apart on the bar side of said lenses, a rotatable slotted disc in axial alignment with said scanning disc on the transducer side thereof, said slotted disc having slots therein one in alignment with each of said lenses, members on the transducer side of said slotted disc having slots therein one in alignment with each of said transducers, said transducers being spaced from the axis of said disc the same radial distance as said lenses, and mean for rotating said discs in synchronism.

References Cited

UNITED STATES PATENTS

| | | | |
|---|---|---|---|
| 2,481,310 | 9/1949 | Hutchinson et al. | 250—236 |
| 2,548,755 | 4/1951 | Vossberg et al. | 88—14 |
| 3,094,623 | 6/1963 | Weiss | 250—219 |
| 3,146,350 | 8/1964 | Topfer | 250—219 |

RALPH G. NILSON, *Primary Examiner.*

M. ABRAMSON, *Assistant Examiner.*

U.S. Cl. X.R.

250—236